(12) United States Patent
Cover

(10) Patent No.: US 7,543,599 B2
(45) Date of Patent: Jun. 9, 2009

(54) SIPHON AND BACKFLOW RESISTANT VALVE

(75) Inventor: Luzerne D. Cover, Avon Lake, OH (US)

(73) Assignee: Phoenix Products, Inc., Avon Lake, OH (US)

( * ) Notice: Subject to any disclaimer, the term of this patent is extended or adjusted under 35 U.S.C. 154(b) by 411 days.

(21) Appl. No.: 11/474,707

(22) Filed: Jun. 26, 2006

(65) Prior Publication Data

US 2007/0295404 A1    Dec. 27, 2007

(51) Int. Cl.
*E03C 1/10* (2006.01)

(52) U.S. Cl. .................. 137/218; 137/216.2; 137/512.4; 137/625.4

(58) Field of Classification Search .............. 137/216.2, 137/218, 512.4, 625.4
See application file for complete search history.

(56) References Cited

U.S. PATENT DOCUMENTS

| | | | | |
|---|---|---|---|---|
| 2,033,467 A | * | 3/1936 | Groeniger | 137/217 |
| 3,857,773 A | * | 12/1974 | Du Bois et al. | 204/242 |
| 3,951,164 A | | 4/1976 | Crist | |
| 4,508,136 A | * | 4/1985 | Kah, Jr. | 137/218 |
| 4,953,584 A | * | 9/1990 | Vegso | 137/218 |

\* cited by examiner

*Primary Examiner*—Stephen M Hepperle
*Assistant Examiner*—Craig M Schneider
(74) *Attorney, Agent, or Firm*—Tarolli, Sundheim, Covell & Tummino LLP

(57) ABSTRACT

A valve assembly for preventing backflow and siphoning in a plumbing line, the valve assembly comprising a valve body including a first end having a first aperture for receiving liquid from a supply source, a second end having an exit port for releasing liquid to a demand source, and a second aperture for receiving air. The assembly further includes a variable thickness diaphragm located within a valve chamber having a first and a second portion, the first portion for influencing the flow of liquid in the first aperture and the second portion for influencing the flow of air in the second aperture, the second portion having a flex line for enhancing the amount of flexing provided by the second portion. The first portion further includes a protuberance for enhancing the strength of the diaphragm during low vacuum sealing conditions.

4 Claims, 5 Drawing Sheets

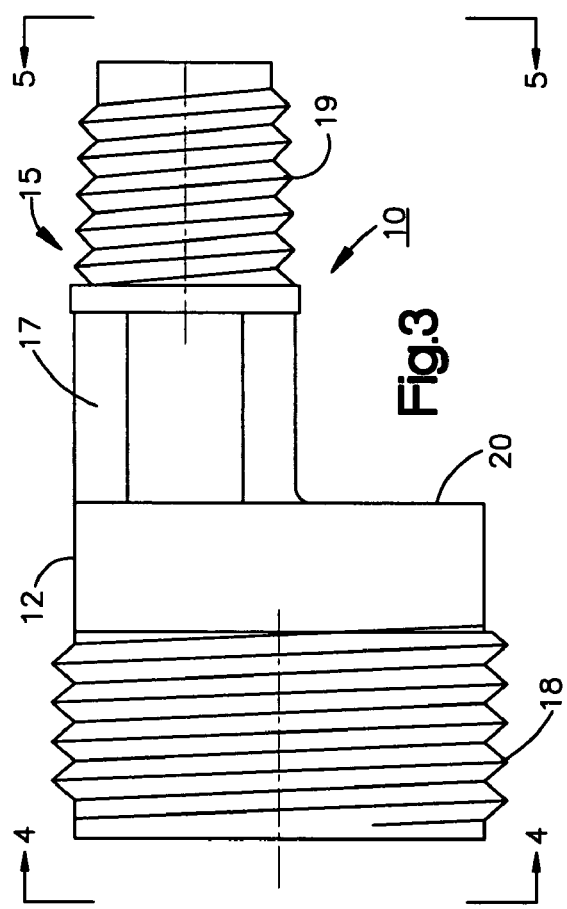
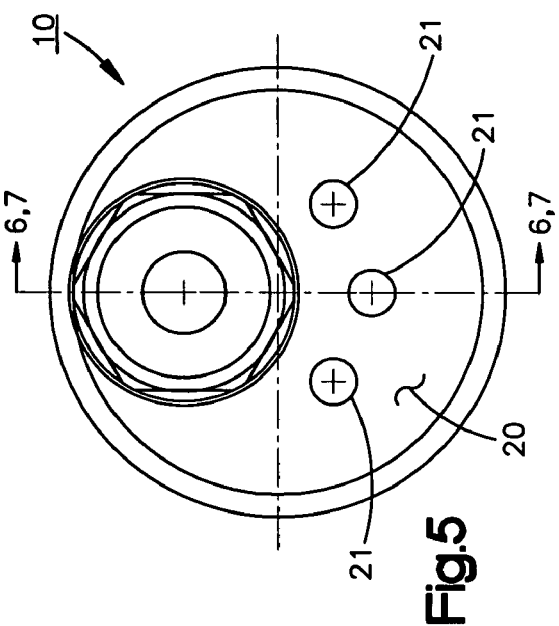
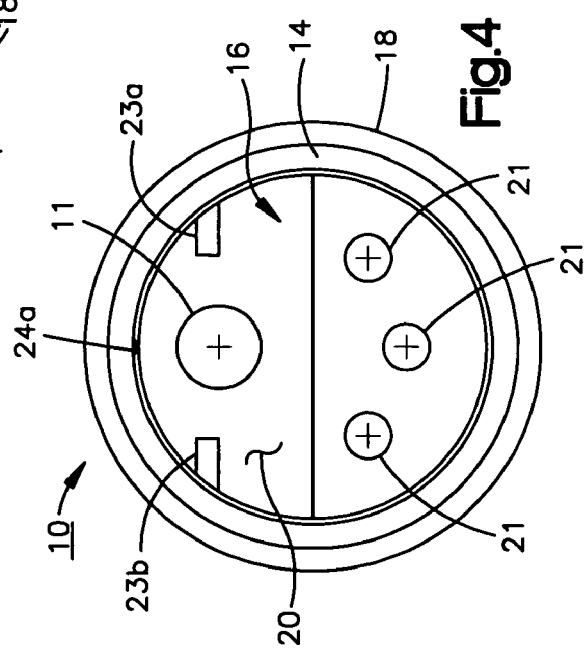

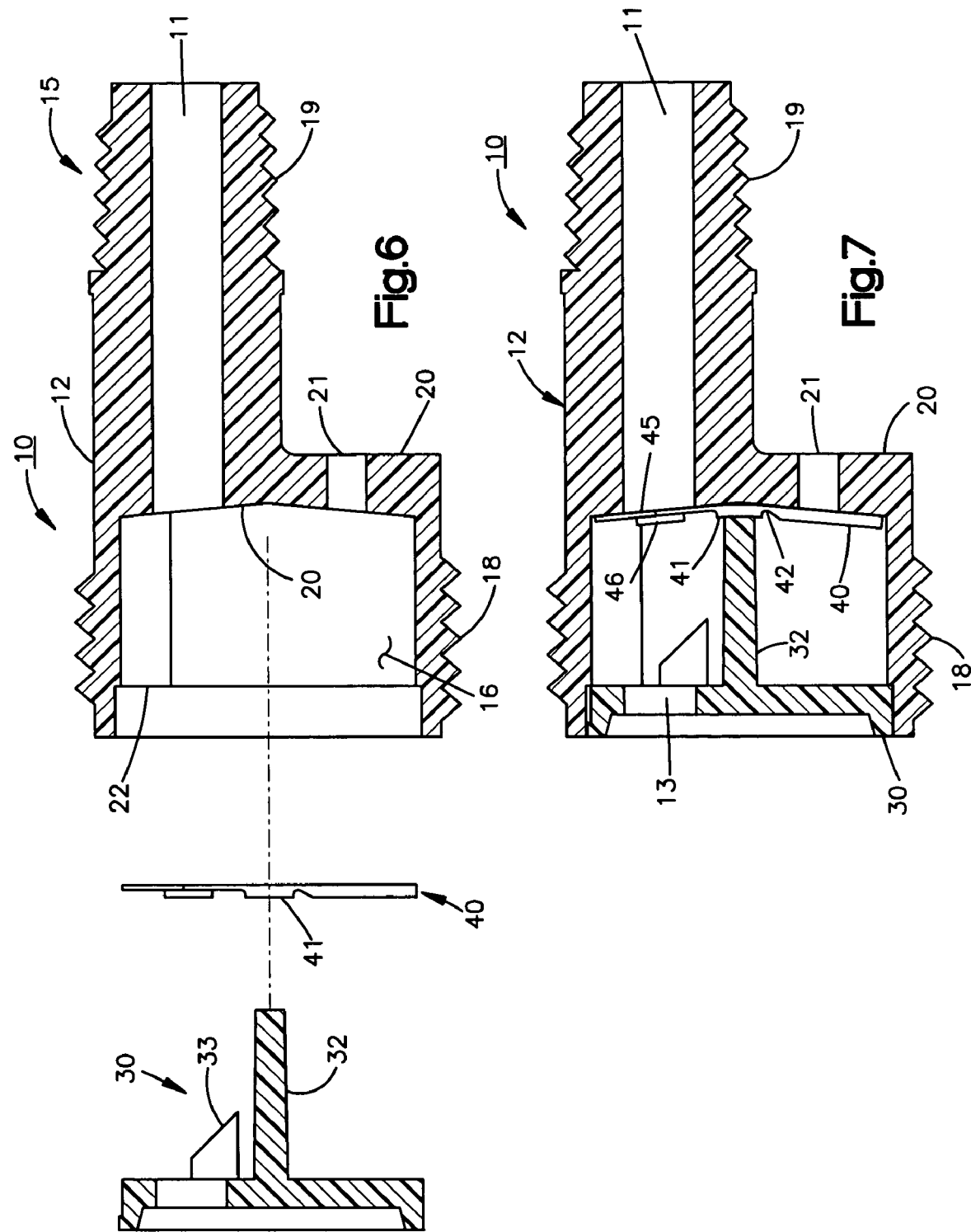

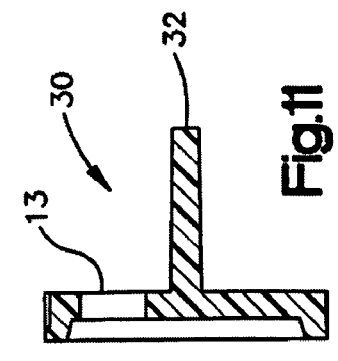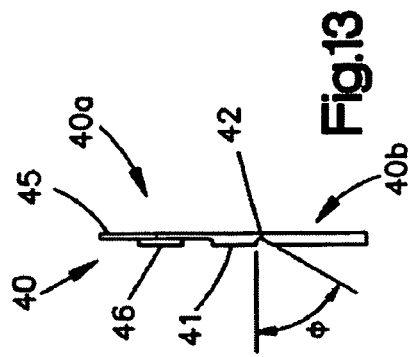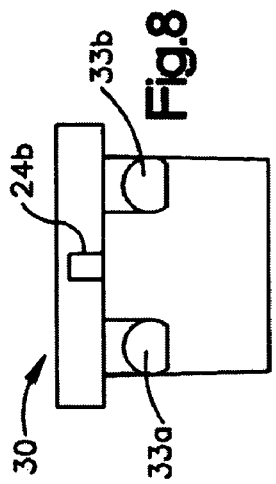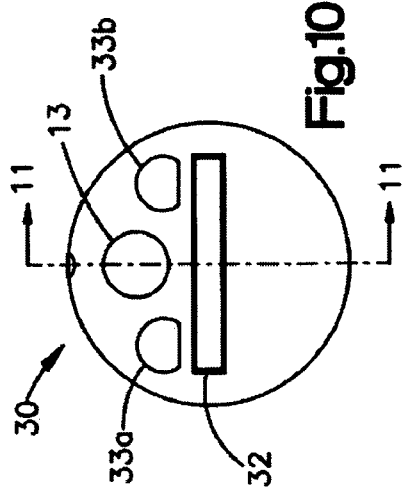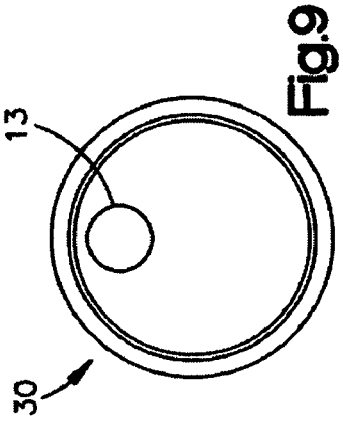

SIPHON AND BACKFLOW RESISTANT VALVE

TECHNICAL FIELD

The present invention concerns a fluid valve structure, more specifically, a valve used in a fluid-feed line that is resistant to both backflow and siphon conditions.

BACKGROUND ART

The valve structure of the present disclosure is in the category or class of valves which are adapted to insertion in a fluid-feed line between a nozzle or discharge orifice and the fluid supply from which fluid is drawn. Such a valve can be used in a multiplicity of lines and is especially adaptable, but not limited to residential fluid systems, self-contained fluid systems and systems having limited space.

The valve herein is described in the context of the utilization of water systems which are found in residential applications, manufactured homes, and recreational vehicles, and is applicable to any system which incorporates a flexible hose connection, whether it be found in a shower, wash basin, bath tub, or the like. The valve of this structure is especially useful in such an environment incorporating fluid systems having a closed or self-contained water supply source from which all utilization of water derives.

There is a heightened concern surrounding the contamination of residential water supply, and especially for self-contained water supply systems. As a result, such systems are subject to rather stringent sanitary codes, which require an insertion in the supply line of valves designed to prevent backflow or re-entry of liquids or solids into the system supply. Backflow is the reversal of the normal and intended direction of flow of water in a pipe line. Siphonage or back siphonage occurs when water in a supply line produces a flow of water in a direction opposite the path of normal flow because of below atmospheric pressure in the supply system.

Valves designed to achieve this result, often referred to as vacuum breaker valves have been in use for several years, and are associated with or capable of permitting the entry of air into the water line under conditions that would otherwise create a siphon condition. In such valves, many complex designs have been used in order to open and close such air vents and to prevent the fluid from leaking through the air vents. An example of such a valve is demonstrated in U.S. Pat. No. 3,951,164.

Increased sanitary code requirements, in particular American Society of Sanitary Engineers "ASSE" section 1014, the performance requirements for hand-held showers (hereinafter "the Code") have made many, if not all, existing valve designs incapable of passing certification tests under the new provisions. The Code requires a valve that prevents backflow of water when a vacuum pressure is applied to the outlet end of the valve ranging between six (6) inches to twenty-four (24) inches of mercury. Further the Code requires there to be no back-siphonage of water from downstream piping into the supply piping when the check valve seat or disc is fouled to a partially open position by debris, which is simulated in the certification test by a 0.032" diameter wire while the outlet side of the valve is under a vacuum.

An example of a vacuum breaker valve incapable of satisfying the relatively recent Code requirements is demonstrated in U.S. Pat. No. 4,953,584 issued to Lajos Vegso. The valve found in '584 patent includes a diaphragm having a uniform thickness that is unable to accommodate the flexibility needed for the unrestricted flow of fluid while remaining rigid enough to prevent the collapse of the diaphragm when being subjected to the vacuum levels required by the Code. The '584 patent further fails to provide the needed flexibility in the diaphragm or pressure assistance from either air or liquid when debris is simulated by the 0.032" diameter wire.

What is needed is an improved vacuum breaker valve assembly capable of satisfying the requirements of the Code as discussed above, resistant to both backflow and back-siphonage.

SUMMARY OF THE INVENTION

The siphon and backflow resistant valve concerns an assembly having a valve body that includes a first end with a first aperture for receiving liquid from a supply source, a second end having a port for releasing liquid to a demand source, and a second aperture for receiving air. The valve assembly also includes a valve chamber located within the valve body that at least a portion of the chamber is enclosed by a cap assembly. The valve assembly further concerns a variable thickness diaphragm that is located within the valve chamber having a first and a second portion, where the first portion influences the flow of liquid from the first aperture and the second portion influences the flow of air from the second aperture. The diaphragm also includes a flex line for enhancing the amount flexing produced by the second portion.

In one embodiment, the flex line is a linear section extending along the diaphragm. In this embodiment the flex line is a segment of the diaphragm having a reduced cross-sectional area. In a separate embodiment, the flex line reduces the cross-sectional area of the second portion along the flex line by approximately 50 percent.

In another embodiment, the first portion of the diaphragm includes a projection or protuberance for adding strength to the diaphragm during low vacuum conditions. The projection is integral to, and extends from the diaphragm adding as much as twice the material thickness in a prescribed area. In this embodiment, the projection is circular, but can assume other geometrical configurations without departing from the spirit or scope of the invention. The geometrical strength to the diaphragm concerns only a single condition, that is when the first portion assumes a closed position. During this low vacuum condition, the projection prevents the collapsing of the first portion, yet the first portion's surrounding material thickness is reduced to prevent air and debris from passing around the inlet orifice.

In one embodiment the diaphragm has a durometer range between 35 and 45. In the illustrated embodiment, the diaphragm durometer value is approximately 40 and is made from Ethylene Propylene Diene Monomer "EPDM" rubber, and has a variable thickness over the entire diaphragm ranging between 0.010 and 0.030 inches.

According to a feature of one embodiment, the cap assembly includes a securing member having a width less than the inner diameter of the valve chamber. As such, the air or liquid within the chamber can assist in the sealing engagement produced by the diaphragm. The securing member further provides a coacting arrangement with an abutment portion on the diaphragm for embracing the diaphragm to the valve chamber.

These and other advantages and features of the exemplary embodiments of the siphon and backflow resistant valve are described in detail in conjunction with the accompanying drawings.

BRIEF DESCRIPTION OF THE DRAWINGS

FIG. 3 is a side view of the valve in FIG. 1;

FIG. 4 is a first end view of the valve in FIG. 3 along line 4-4;

FIG. 5 is a second end view of the valve in FIG. 3 along line 5-5;

FIG. 6 is an exploded sectional view of the valve in FIG. 5 along section line 6-6;

FIG. 7 is an assembled sectional view of the valve in FIG. 5 along section line 7-7;

FIG. 8 is a plan view of a cap assembly;

FIG. 9 is a first end view of the cap assembly of FIG. 8;

FIG. 10 is a second end view of the cap assembly of FIG. 8;

FIG. 11 is a sectional view of the cap assembly of FIG. 10 along line 11-11;

FIG. 12 is a plan view of a flexible diaphragm;

FIG. 13 is a side view of the flexible diaphragm of FIG. 12;

DETAILED DESCRIPTION OF THE PREFERRED EMBODIMENTS

Figure 1:
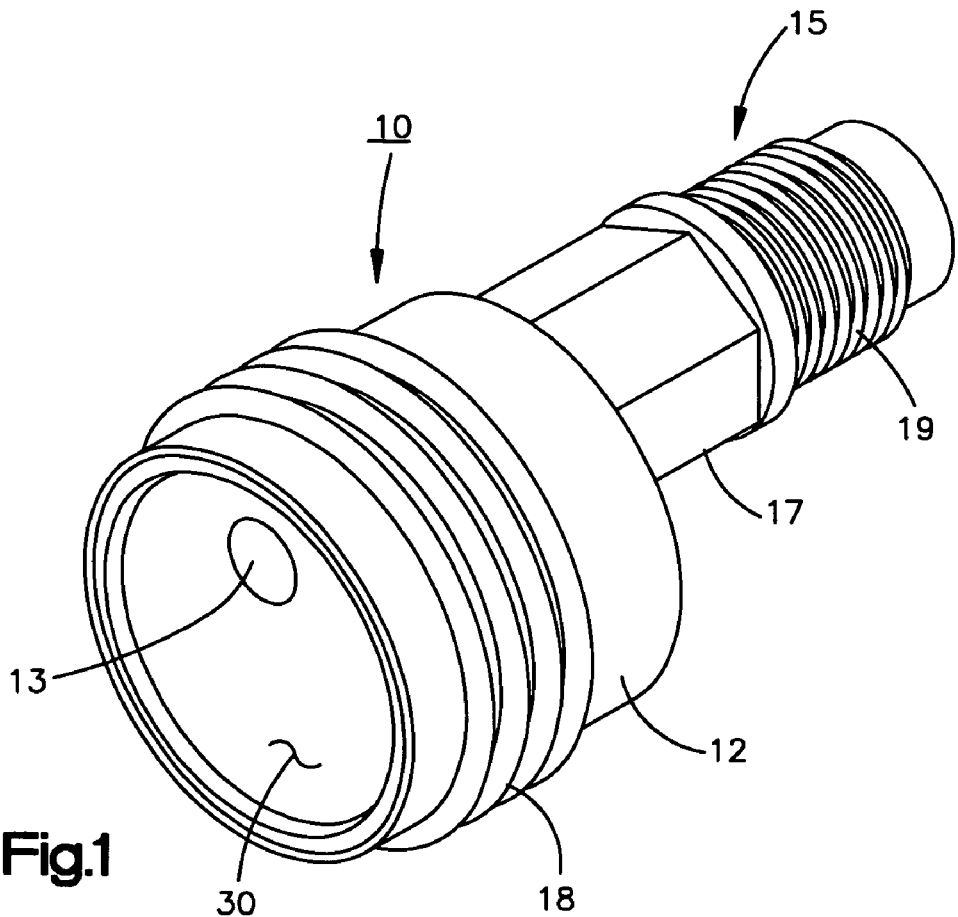
FIG. 1 is a first perspective view of the siphon and backflow resistant valve.
Figure 2:
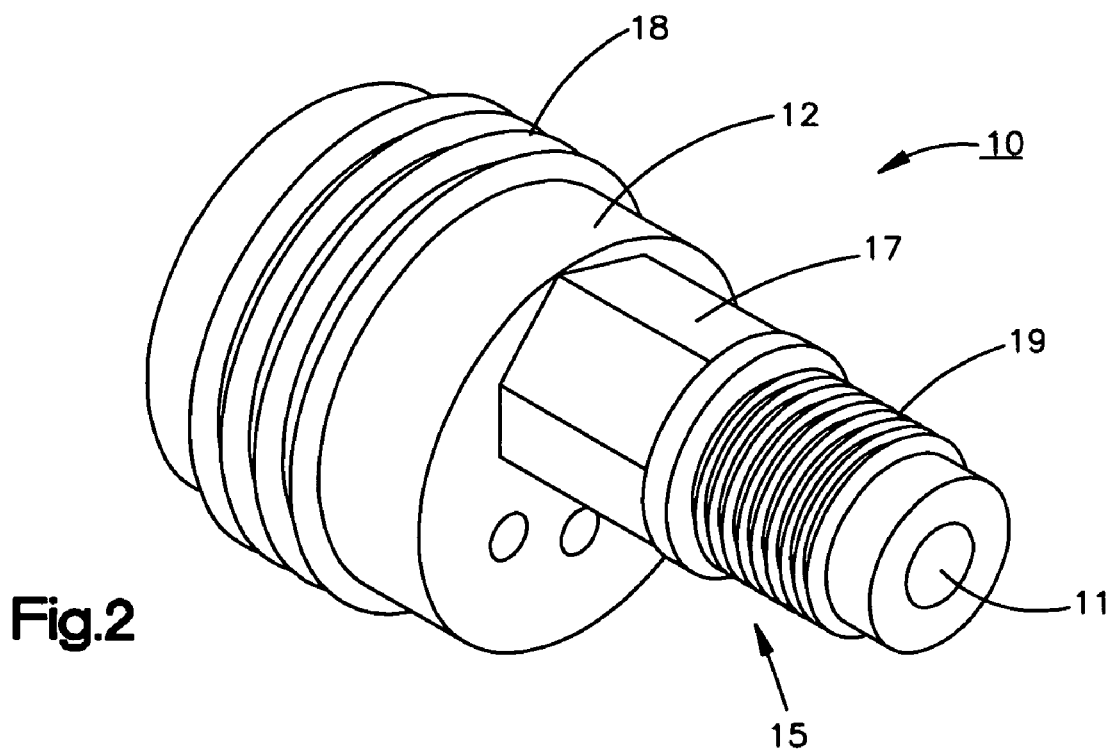
FIG. 2 is a second perspective view of the valve in FIG. 1.

The description of the preferred embodiments is directed to a siphon and backflow resistant valve assembly 10, depicted in FIGS. 1 and 2. The valve assembly includes a generally tubular body 12. As best seen in FIG. 2, an inlet nipple 15 extends from, and formed integrally with the valve body 12, and includes a plurality of flats 17 suitable for engaging a tool for tightening the nipple to a plumbing fitting. The nipple portion 15 of the valve assembly 10 further includes external threads 19 for mating the nipple portion with the plumbing fitting. Examples of plumbing fixtures adaptable to plumbing nipples or fittings can include a shower, wash basin, bath tub, and the like. In the illustrated embodiment, the external threads 19 are ⅛-27 NPT, but could be any thread size suitable for providing a sealable engagement with a plumbing fixture.

At an end on the valve body 12 opposite the nipple 15 is a main valve chamber 16 as best seen in FIGS. 4 and 6. A generally tubular wall 14, a bottom wall 20, and a cap assembly 30 form the valve chamber 16. The cap assembly 30 is shown in FIGS. 1 and 6-11 and is positioned within a recess or counter bore 22 of the valve body 12. The bottom wall 20 includes a plurality of air apertures 21 that under certain conditions, as described below, allow air to flow into the main valve chamber 16. In the illustrated embodiment, three air apertures are used, each aperture having diametrical opening approximately ranging between 0.060"-0.090" and in one preferred embodiment the aperture diameter is 0.085".

Extending through the nipple portion 15, tubular wall 14, and into the valve chamber 16 is an inlet orifice 11 for receiving the flow of fluid from the plumbing fitting (not shown) into the valve chamber 16 under certain conditions. In one preferred embodiment, the inlet orifice 11 has a diameter of approximately 0.150". External threads 18 surround the exterior portion of the tubular wall 14 such that the valve assembly 10 can be adapted to a corresponding plumbing fitting. In one preferred embodiment, the external threads 18 are ½-14 NPSM threads, but could be any size having a suitable thread to provide a sealing engagement with the plumbing fitting. Located substantially in-line with the inlet orifice 11 is an outlet orifice 13, which is located within the cap assembly 30. The alignment between the orifices 11 and 13 can be accomplished by any number of structures known to those skilled in the art. In the illustrated embodiment, alignment is achieved by a key 24a located in tubular wall 14 that corresponds to keyway 24b in the cap assembly 30. The alignment is further facilitated by guides 23a and 23b, which corresponds to projections 33, represented individually by 33a and 33b, respectively.

Referring now to FIGS. 6 and 7 are cross sectional views of the valve assembly 10. FIG. 6 depicts an exploded assembly view having the cap assembly 30, and a flexing member or diaphragm 40 assembled within the main valve chamber 16 of valve body 12. The diaphragm 40 is secured between the cap assembly 30 and valve body 12 at the bottom wall 20 through plate member 32, which is in contact with an abutment portion 41 located on the diaphragm shown in FIG. 7.

The diaphragm 40 is designed having a variable thickness as revealed in the side view of FIG. 13. In one preferred embodiment, the diaphragm is made from a material having a 35-45 durometer range. In the illustrated preferred embodiment, the diaphragm is made from Ethylene Propylene Diene Monomer "EPDM" rubber having a durometer value of approximately 40. The diaphragm could be made from other materials having similar characteristics without departing from the spirit and scope of the claimed invention. The abutment 41 is centrally and symmetrically located about the generally circular diaphragm 40, dividing it into a first and second section 40a and 40b, respectively as depicted in FIG. 12. A first 43 and second 44 lobe portion extends along the first section 40a, which assist in the placement of the diaphragm within the valve chamber 16. A cover portion 45 extends from the first section 40a, and is aligned within the valve chamber 16. The cover portion 45 when located within the valve chamber is positioned over the inlet orifice 11. When liquid is flowing, by virtue of a user turning a conventional valve in the plumbing fitting, the cover portion 45 is displaced allowing the liquid to pass into and throughout the chamber 16, eventually exiting through the outlet orifice 13.

Figure 14:
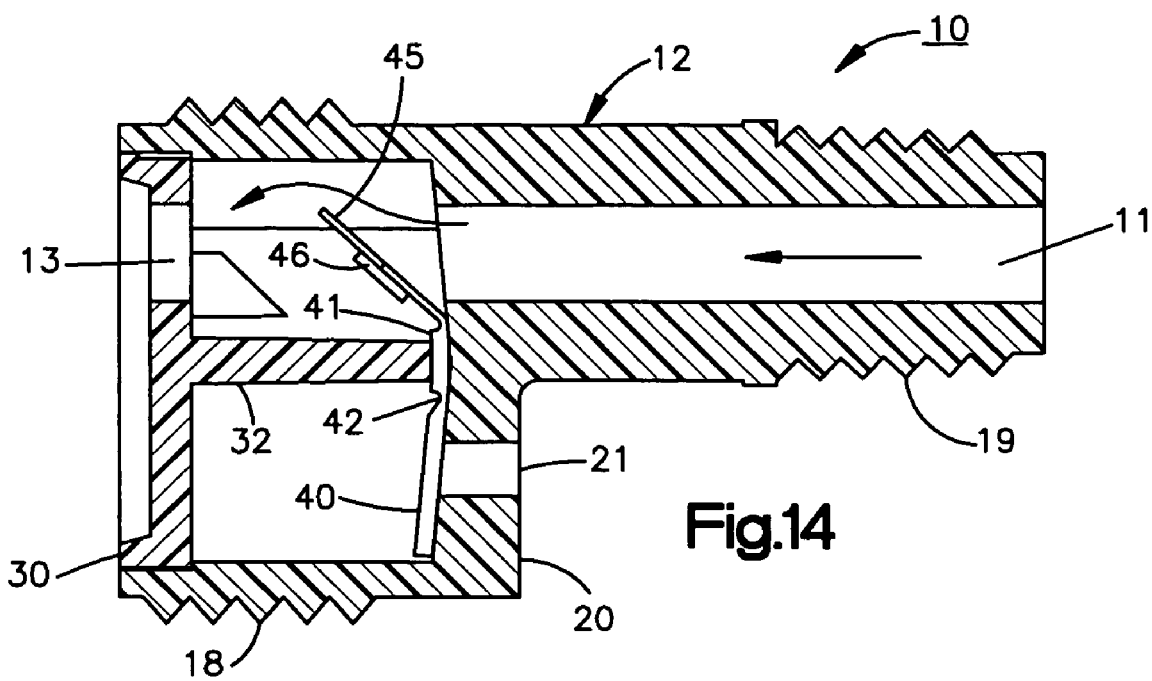
FIG. 14 is an operational view depicting the valve operation during a flow of liquid past the flexible diaphragm with a cover portion assuming an open position.
Figure 15:
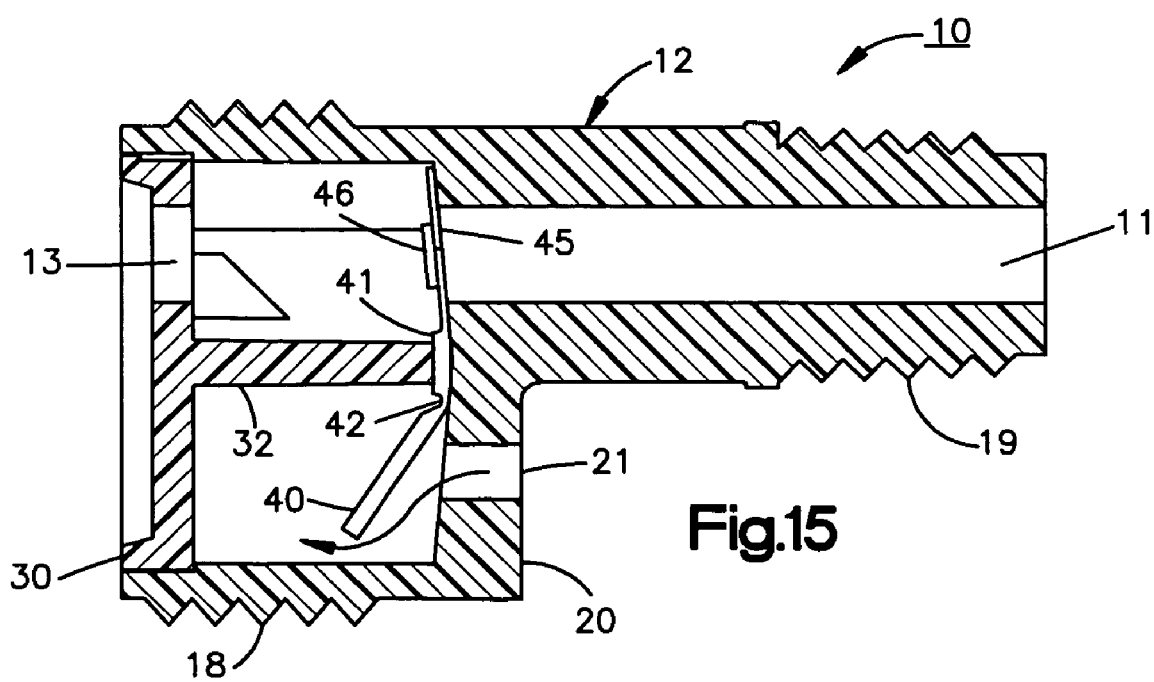
FIG. 15 is an operational view depicting the valve operation during a flow of air past the flexible diaphragm with the cover portion assuming a closed position to prevent siphoning or backflow.

In operation the cover portion 45 and second section 40b transition between an opened and closed position as depicted in FIGS. 14 and 15. The cover portion 45 is displaced to an open position in FIG. 14 and assumes a normally closed position in FIG. 15. Situated on, and integral to the cover portion 45 is a circular protuberance or boss 46. The novel design of boss 46 is to prevent the cover portion 45 from collapsing into the inlet orifice 11 during vacuum conditions occurring in operation or during Code certification tests. Preventing the collapse of the cover portion 45 provides reassurance that backflow or siphoning conditions in the valve 10 have been avoided. The variable thickness of the diaphragm, in particular the relatively reduced cross sectional areas of the first and second sections 40a and 40b allows for improved sealing properties with the inlet orifice 11 and apertures 21.

The boss in one preferred embodiment includes a thickness slightly greater than the cover portion 45, which in this embodiment is approximately 0.010". Therefore, the additional material from the boss 46 provides a stack-up thickness in the strengthened area between 0.020" and 0.030". The boss 46 in the illustrated embodiment is annular having a diameter of approximately 0.100", but could assume other geometries without departing from the scope or spirit of the invention. A pair of gaps of approximately 0.060" between the first and second lobe portions 43, 44 and the cover portion 45 provide a propitious level of flexibility to the cover portion in combination with the added geometrical strength of boss 46 that is suitable for anti-siphoning backflow operation.

Turning now to the area opposite the cover portion 45 of the abutment 41 is the second section 40b of the diaphragm 40. The second section 40b covers apertures 21, which under certain conditions raise the second section, thereby providing air throughout the main valve chamber 16. Air is permitted to enter the chamber 16, as shown in FIG. 15 when pressure downstream from the valve is less than the pressure in the chamber, creating a low vacuum condition that is highly susceptible to siphoning and backflow. The configuration of the diaphragm's second section 40b is specifically designed for enabling the admission of air at heightened siphoning/ backflow conditions during the valve 10 operation and for Code compliance. The air admission criteria in the diaphragm 40 was achieved by designing a line of weakness 42, as best seen in FIGS. 12 and 13. The line 42 acts like a hinge allowing the displacement of the second section 40b as air enters the main valve chamber 16 during vacuum conditions. In one embodiment, the line of weakness 42 is a reduction in the cross-sectional area of the second section 40b. In another embodiment, the line of weakness is a 60° (represented by angle β in FIG. 13) fillet extending from the abutment 41 with a 0.010" radius into a second section 40b. The material thickness of the second section in this embodiment is 0.030" therefore the fillet removes approximately half the material from the cross section.

In operation, liquid passes through inlet orifice 11 displacing the cover portion 45 to an open position represented in FIG. 14. The liquid fills the entire main valve chamber 16 such that liquid passes to both sides of plate member 32, thereby adding pressure against the second portion 40b. Flow throughout the main valve chamber 16 is made possible since the width of the plate member 32 is less than the inner diameter of tubular wall 14. The additional pressure by the liquid against second portion 40b while in a normally closed position in addition to its reduced thickness, reassures a sealing engagement is occurring between the diaphragm 40 and apertures 21. The termination of the flow of liquid at the plumbing fitting creates a heighten opportunity for a low vacuum condition. Assuming a low vacuum condition occurs, the force of air from the atmospheric pressure outside the valve acts on the second section 40b of the diaphragm 40 through apertures 21. The pressure over the surface area of the apertures 21 produces a cantilever force that raises the second section 40b by pivoting about the line of weakness 42 displacing the section from its normally closed position. As the second section is displaced, the air passes throughout the main valve chamber and produces pressure against the cover portion 45. It has been determined in one preferred embodiment that three apertures 21 each having a 0.085" diameter provide enough pressure for preventing backflow in siphoning conditions. The pressure against the cover portion 45, in addition to the diaphragm's reduced thickness provides reassurance that an antisiphon/backflow sealing engagement occurred between the cover portion and the bottom wall 20. The boss 46 provides additional strength to the cover portion in one direction to prevent failure of the sealing engagement or collapsing during low vacuum conditions or during Code certification testing, while offering no additional strength in a second direction thereby allowing the maximum liquid flow conditions to occur.

It will be understood that various modifications can be made without departing from the spirit and scope of the claimed invention.

I claim:

1. A vacuum breaker valve assembly located between a plumbing fitting and a water supply line for preventing backflow and siphoning conditions, the valve assembly comprising:
   a) a valve housing including a first end and a second end, the first end having an inlet orifice for receiving water into said housing from a supply source, the second end having an exit port for releasing water to a demand source;
   b) a substantially cylindrical valve chamber located within said valve housing, said chamber at least partially enclosed by an end wall and a cap assembly;
   c) a plurality of air apertures located in said end wall for allowing the passing of air into said chamber;
   d) a variable width diaphragm located within said chamber having:
      i) a first and a second portion, said first portion assuming a normally closed position by sealing said inlet orifice, said second portion assuming a normally closed position by sealing said air apertures;
      ii) an abutment portion that coacts with said cap assembly, the abutment for securing the diaphragm to said end wall;
      iii) a pair of lobes extending from said first portion;
      iv) a notch line located along said second portion providing enhanced flexing to said second portion between an open and closed position; and
      v) a projection extending from said first portion providing increased strength to the first portion when sealing said inlet orifice;
   e) a recess within said valve chamber for receiving and orienting said cap assembly;
   f) whereby a sub-atmospheric pressure within said supply line results in the flexing of the second portion along said notch line thereby displacing the second portion from said closed position to said open position allowing air to enter through said air apertures and sealing said first portion to an antibackflow position.

2. The valve assembly of claim 1, wherein said variable width diaphragm is made from EPDM material.

3. The valve assembly of claim 1, wherein said notch line reduces the overall thickness of the second portion along the line by approximately 50 percent.

4. The valve assembly of claim 1, wherein sub-atmospheric pressure within said supply line results in the flexing of the second portion along said notch line thereby displacing the second portion from said closed position to said open position allowing air to enter through said air apertures such that a sealing engagement is provided by the first portion in the presence of debris between said first portion and said inlet orifice.

* * * * *